(12) United States Patent
Paule et al.

(10) Patent No.: US 10,800,382 B2
(45) Date of Patent: Oct. 13, 2020

(54) SYNTHETIC COMPONENT WITH SENSOR

(71) Applicant: MAGNA Exteriors GmbH, Sailauf (DE)

(72) Inventors: Thomas Paule, Glattbach (DE); Klaus Muenker, Griesstaett (DE)

(73) Assignee: MAGNA EXTERIORS GMBH, Sailauf (DE)

(*) Notice: Subject to any disclaimer, the term of this patent is extended or adjusted under 35 U.S.C. 154(b) by 255 days.

(21) Appl. No.: 15/834,450

(22) Filed: Dec. 7, 2017

(65) Prior Publication Data
US 2018/0170314 A1 Jun. 21, 2018

(30) Foreign Application Priority Data
Dec. 20, 2016 (DE) .................... 10 2016 225 668

(51) Int. Cl.
| | | |
|---|---|---|
| *G01S 15/04* | (2006.01) | |
| *B60S 1/02* | (2006.01) | |
| *B60S 1/56* | (2006.01) | |
| *G01S 7/40* | (2006.01) | |
| *G01S 13/931* | (2020.01) | |
| *G01S 7/02* | (2006.01) | |
| *G01S 15/931* | (2020.01) | |

(52) U.S. Cl.
CPC .............. *B60S 1/026* (2013.01); *B60S 1/023* (2013.01); *B60S 1/56* (2013.01); *G01S 7/02* (2013.01); *G01S 7/4004* (2013.01); *G01S 13/931* (2013.01); *G01S 15/04* (2013.01); *G01S 15/931* (2013.01); *G01S 2007/027* (2013.01); *G01S 2007/4047* (2013.01); *G01S 2013/9327* (2020.01)

(58) Field of Classification Search
CPC ...... G01S 15/04; G01S 15/931; G01S 7/4004; G01S 13/931; G01S 7/02; G01S 2013/9327; G01S 2007/027; G01S 2007/4047; G01S 2007/4039; G01S 7/4008; G01S 7/021; G01S 2013/93271; G01S 2013/93272; G01S 2013/93275; B60S 1/026; B60S 1/56; B60S 1/023
USPC ........ 219/202, 203, 543, 544, 549, 552, 553
See application file for complete search history.

(56) References Cited

U.S. PATENT DOCUMENTS

| | | | |
|---|---|---|---|
| 6,710,302 B1 * | 3/2004 | Rennick | .............. G01S 15/04 |
| | | | 219/202 |
| 2005/0123743 A1 | 6/2005 | Martinazzo | |
| 2008/0034528 A1 | 2/2008 | Bourke et al. | |

FOREIGN PATENT DOCUMENTS

| | | |
|---|---|---|
| CN | 104507809 A | 4/2015 |
| DE | 102013007560 A1 | 12/2013 |
| DE | 102013211419 A1 | 12/2014 |

(Continued)

OTHER PUBLICATIONS

CNIPA Office Action for CN Patent Application No. 201711326028.4 (dated May 6, 2020).

*Primary Examiner* — David J Walczak
(74) *Attorney, Agent, or Firm* — Jordan IP Law, LLC; Todd A. Vaughn

(57) ABSTRACT

A motor vehicle component composed of a synthetic material and which includes a sensor mounted on at least one region thereof. Conductive elements are mounted within the at least one region, and composed of a material that may be stimulated by induction. A coil is provided for inductive heating of the conductive elements.

20 Claims, 2 Drawing Sheets

(56) References Cited

FOREIGN PATENT DOCUMENTS

DE 102014222116 A1 5/2016
WO 2016073144 A1 5/2016

* cited by examiner

SYNTHETIC COMPONENT WITH SENSOR

CROSS-REFERENCE TO RELATED APPLICATIONS

The present application claims priority 35 U.S.C. § 119 to German Patent Publication No. DE 102016225668.8 (filed on Dec. 20, 2016), which is hereby incorporated by reference in its entirety.

TECHNICAL FIELD

Embodiments relate to a motor vehicle component that is composed of a synthetic material and which includes at least one region into which is mounted a sensor having electrical and data connections.

BACKGROUND

This section provides information related to the present disclosure which is not necessarily prior art.

In the case of motor vehicles, sensors are installed in parts of the body that are used for distance measurement, for example. Such sensors may be built into a bumper at the front and/or at the rear and during parking or driving detect the distance from an obstacle or a further vehicle.

In the case of sensors operating with radar waves, provisions are made to avoid icing in the winter. It must be ensured that no layer of ice may form in front of the radiation region of the sensor, because otherwise the operation of the sensor will no longer be provided. It is known to provide the surface of the sensor with a heater for this purpose. German Patent Publication No. DE 10 2011 107 216 A1 describes a radome of a transmitting and receiving device for radar waves in a motor vehicle. A heater is disposed face-to-face between a supporting layer and a covering layer of the covering layer. In particular, the heater is embodied as an electrically conductive coating.

U.S. Patent Publication No. US 20050123743 A1 discloses a powder coating for a synthetic material with a magnetic material. A conductive layer is formed that may be inductively excited.

German Patent Publication No. DE102014222116 A1 discloses heating for a vehicle windscreen is known, with which the heating wires are attached conventionally. The contacting is carried out inductively and is monitored by a temperature or current sensor.

European Patent Publication No. EP1646266 A2 discloses a body part for a motor vehicle and a heater for the body part that is associated with a radar sensor. However, a polymer heating film with integrated conducting tracks in the form of meanders is used here as the heater.

The known systems are based on complete heating systems. Said heating systems are additional components that are integrated within the entire system and that must be connected to a dedicated power supply on the motor vehicle. In this case, contacting the heating systems, the integration of the contacting and the protection against ambient influences are difficult. As a result of the ingress of moisture and the resulting leakage currents, failure of such heating systems may easily occur.

SUMMARY

This section provides a general summary of the disclosure, and is not a comprehensive disclosure of its full scope or all of its features.

Embodiments are to provide an optimized heating system for the combination of a component for a motor vehicle and a sensor.

Embodiments relate to a component assembly for a motor vehicle component that is composed of a synthetic material. The synthetic component comprises at least one region on which a sensor, such as, for example, a transmitter/receiver for GHz waves, is mounted within the vehicle. The sensor comprises electrical and data connectors. Conductive elements of a material that may be stimulated by induction are mounted within the region, and a coil for inductive heating of the conductive elements is mounted within the vehicle. The inductive heating of the synthetic component may be carried out without electrical contacting of the heating element and is insensitive to ambient influences. Advantageously, the coil is integrated within the sensor. As a result, the coil is encapsulated and protected against ambient influences, and may be operatively contacted via the sensor.

In accordance with embodiments, advantageously, the conductive elements may be composed of magnetite. In this case, it is advantageous that the conductive elements are attached to the base material component with a screen printing method.

In accordance with embodiments, the conductive elements may be mounted on a film that is fixed within the vehicle to the synthetic component.

In accordance with embodiments, advantageously, the conductive elements may be mounted as a grid structure. The distance between the individual grids of the grid structure is selected such that the signals of the sensor pass without interference.

In accordance with embodiments, advantageously, the conductive elements may be covered by a protective layer.

In accordance with embodiments, advantageously, the region (A) of the synthetic component may correspond to the size and the shape of the surface of the sensor.

In accordance with embodiments, alternatively, it may be advantageous that the region (A) is smaller or larger than the surface of the sensor and has an arbitrary outer contour.

Further areas of applicability will become apparent from the description provided herein. The description and specific examples in this summary are intended for purposes of illustration only and are not intended to limit the scope of the present disclosure.

DRAWINGS

Embodiments will be illustrated by way of example in the drawings and explained in the description below.

DESCRIPTION

Figure 1:
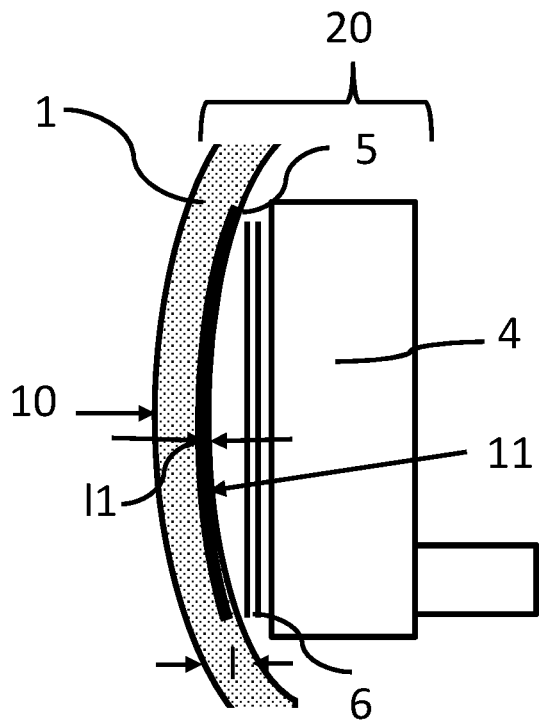
FIG. 1 illustrates a sectional view of a motor vehicle component having a sensor, in accordance with embodiments.

FIG. 1 illustrates a motor vehicle component assembly 20 that includes a component 1 composed of a synthetic material and which is configured to extend upwardly and downwardly. A sensor 4 is mounted on the component 1 in a suitable manner. The synthetic component 1 comprises an outer surface 10 on the outside of the vehicle and an inner surface 11 within the vehicle. On the outside of the vehicle, the outer surface 10 of the synthetic component 1 must be free of ice and snow. The sensor 4 is mounted within the vehicle at the inner surface 11, wherein no fastenings are represented in the drawing. A coil 6 is mounted between the synthetic component 1 and the sensor 4. The coil 6 may be mounted on the sensor 4 or the synthetic component 1.

Electrically conductive structural elements 5 may be mounted on the synthetic component 1, and may be composed of a material that may be inductively stimulated by a coil and may give off thermal energy by the formation of eddy currents. In accordance with embodiments, the electrically conductive structural elements 5 may be composed of magnetite particles that are dissolved in a lacquer and which may be applied to the component 1. The electrically conductive structural elements 5 may be applied as grids. The electrically conductive structural elements 5 may be shaped as meanders, spirals, or another suitable form.

Figure 4:
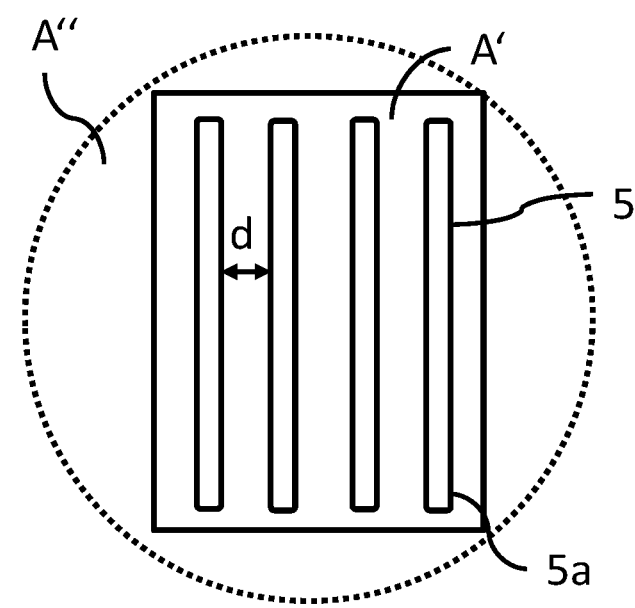
FIG. 4 illustrates a top view of a heatable region of a motor vehicle component having a sensor, in accordance with embodiments.

As illustrated in FIG. 4, the distance d between individual conductive structural elements 5a is selected so that the GHz waves of the transmitter/receiver of the radar sensor pass through the conductive element 5 without problems.

As illustrated in the example of FIG. 1, the conductive structural elements 5a may be applied directly to the synthetic component 1 using for example, a screen printing process. In order to protect the conductive structural elements 5, a protective layer may be applied thereon and/or thereover. The inner surface 11 of the synthetic component 1 within the vehicle is prepared in this case so that the conductive structural elements 5 adhere. Alternatively, the synthetic component 1 may comprise a recess in the region of the sensor 4 that structurally corresponds to the size and shape of the sensor 4. In this case, the recess may have a depth 11 that reduces the total thickness of the synthetic component 1 by up to 20%. The recess has the advantage that the thermal energy produced by the conductive structural elements 5 passes more easily to the outside of the vehicle and also the sensor 4 may be spatially closer in distance to the synthetic component 1.

Figure 2:
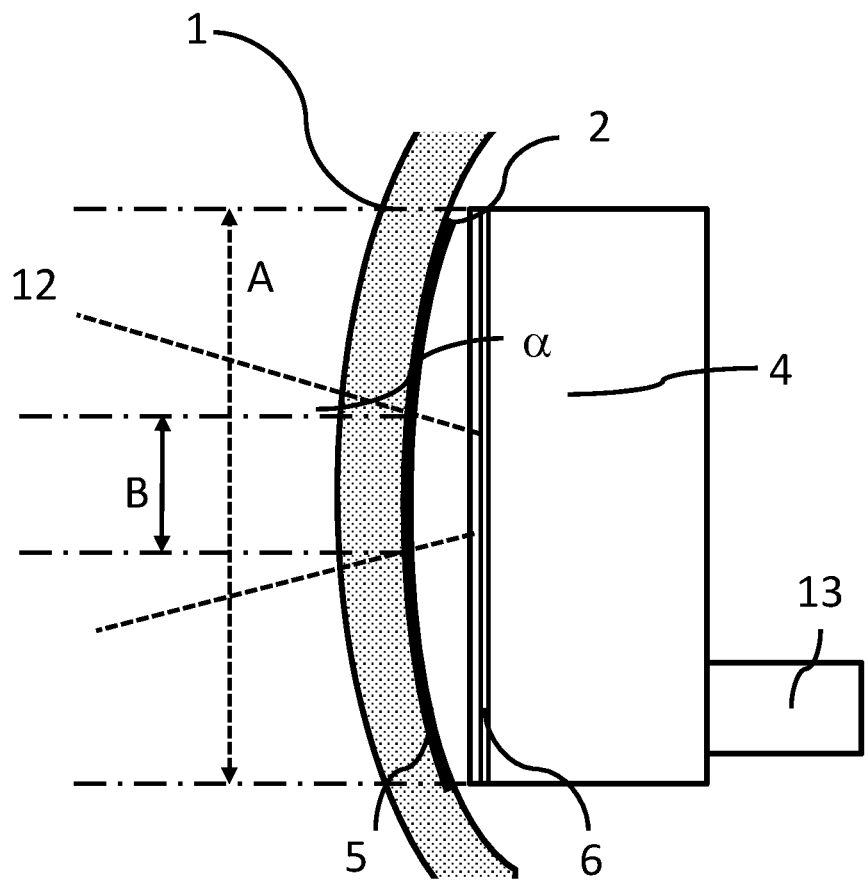
FIG. 2 illustrates a sectional view of a motor vehicle component having a sensor, in accordance with embodiments.

As illustrated in FIG. 2, a motor vehicle component assembly 20 includes a sensor assembly that includes the integration of the coil 6 within the sensor 4. The coil 6 within the sensor 4 of the sensor assembly are connected to an analysis unit and a controller via an electrical connector and a data connector 13.

The conductive structural elements 5 are mounted on a film 2 that is mounted within the vehicle on the synthetic component 1. The shape and size of the film 2 are adapted to correspond to the shape and size of the sensor 4 in this case. In the example of FIG. 4, the film 2 extends in the region A of the synthetic component 1, which corresponds to the size of the sensor 4. The film 2 may also be provided with a protective layer in order to protect the conductive structural elements 5.

A radiation cone 12 from the radar sensor 4 having an angle alpha is indicated schematically. The region B, in which the radiation cone 12 passes through the film 2 with the conductive structural elements 5, may be specially designed with the conductive structural elements 5. It is also possible here to apply very few conductive structural elements 5, and therefore, more in the edge regions up to the extent of the area of the region A. Alternatively, the region (A) may be smaller or larger than the surface of the sensor 4 and may comprise an arbitrary outer contour.

Figure 3:
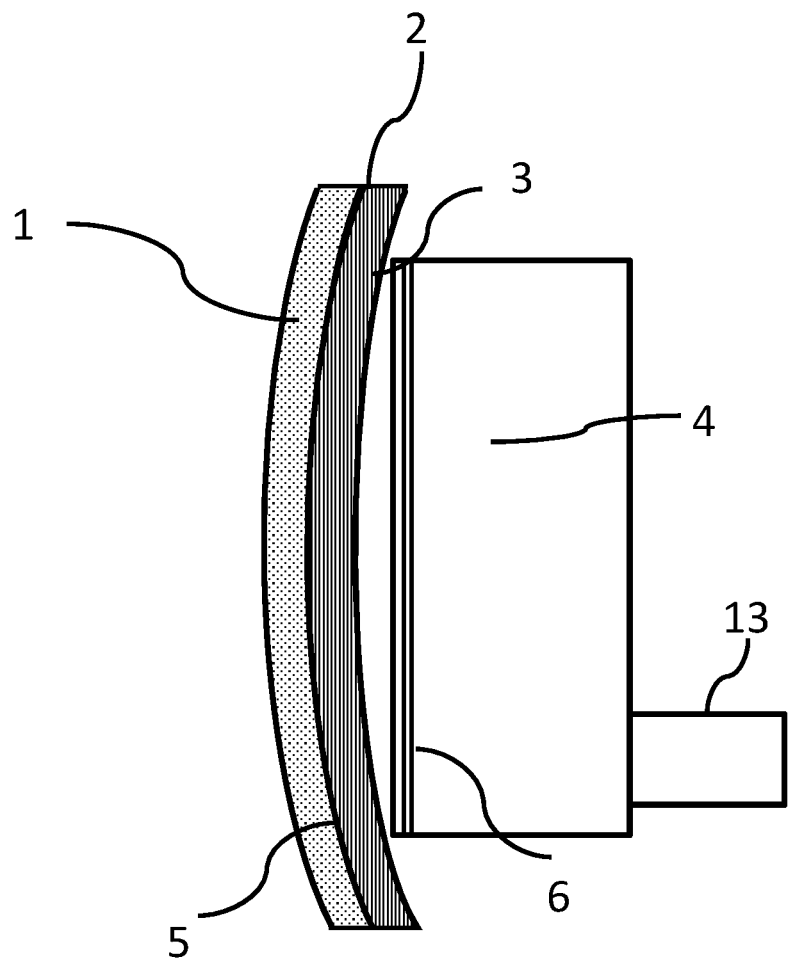
FIG. 3 illustrates a sectional view of a motor vehicle component having a sensor, in accordance with embodiments.

As illustrated in FIG. 3, a motor vehicle component assembly 20 includes a synthetic component 1 that may be used as a number/license plate holder for a bumper or radiator grill. A film 2 is injected between a supporting layer 3 and a covering layer 1 of the component. The film 2 may be, for example, a decorative film that is coated black on the outward-facing side thereof, so that the heater cannot be seen from the outside of the vehicle. The inward-facing side of the film 2 may be printed with the conductive structural elements 5. The supporting layer 3 may be composed of a synthetic material that is normally opaque. The covering layer 1 may be composed of a transparent material. The synthetic component 1 is to hold the sensor 4 on the inside thereof and is installed on the vehicle as a number/license plate holder.

As illustrated in FIG. 4, the conductive structural elements 5a are disposed as strips at a distance d from each other. The strips are to extend over a region A' that corresponds to the size of the sensor 4. An alternative form of a region A" is indicated as a circle. The arrangement of the strips, the shape and the distances are only illustrated by way of example. A person skilled in the art will use his knowledge here in order to find an optimal balance between the penetrability of the conductive elements by radar waves and a good thermal input.

In accordance with embodiments, the integrated sensor 4 may comprise two transmitters, the radar sensor in the GHz range and the coil, which is operated in the MHz range. The transmitters overlap each other without interference.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A motor vehicle component assembly, comprising:
   a component composed of a synthetic material; and
   a sensor mounted on at least one region of the component, the sensor including a transmitter/receiver for GHz waves, and electrical and data connectors;
   a plurality of conductive structural elements, composed of a material that is configured for inductive stimulation, configured for mounting at the at least one region and applied as a grid structure such that a distance between individual conductive structural elements is to permit passing of signals of the transmitter/receiver without interference; and a coil for inductive heating of the conductive structural elements is configured for mounting between the conductive structural elements and the sensor.

2. The motor vehicle component assembly of claim 1, wherein the conductive structural elements are composed of magnetite.

3. The motor vehicle component assembly of claim 1, wherein the conductive structural elements are applied to the synthetic component with a screen printing method.

4. The motor vehicle component assembly of claim 1, further comprising a protective layer over the conductive structural elements.

5. The motor vehicle component assembly of claim 1, wherein the at least one region is configured to correspond to the size and shape of an inner surface of the sensor.

6. The motor vehicle component assembly of claim 1, wherein the at least one region has an arbitrary outer contour.

7. The motor vehicle component assembly of claim 1, wherein the at least one region of the component comprises a recess that structurally corresponds to the size and the shape of the sensor.

8. A motor vehicle component assembly, comprising:
a component composed of a synthetic material;
a film on the inner surface of the component within the motor vehicle;
a plurality of conductive structural elements configured for mounting on at least one region of the component, the conductive structural elements being composed of a material that is configured for inductive stimulation; and
a sensor mounted on the at least one region of the component, the sensor including a transmitter/receiver, electrical and data connectors, and a coil for inductive heating of the conductive structural elements.

9. The motor vehicle component assembly of claim 8, wherein the conductive elements are applied to one side of the film.

10. The motor vehicle component assembly of claim 8, wherein the conductive structural elements are composed of magnetite.

11. The motor vehicle component assembly of claim 8, wherein the conductive structural elements are applied to the synthetic component with a screen printing method.

12. The motor vehicle component assembly of claim 8, wherein the conductive structural elements are applied as a grid structure.

13. The motor vehicle component assembly of claim 12, wherein the distance between individual conductive structural elements is such that signals of the transmitter/receiver of the sensor are to pass without interference.

14. The motor vehicle component assembly of claim 8, further comprising a protective layer over the conductive structural elements.

15. The motor vehicle component assembly of claim 8, wherein the coil is integrated within the sensor.

16. A motor vehicle component assembly, comprising:
a component composed of a synthetic material and which includes a supporting layer and a covering layer;
a film arranged between the supporting layer and the covering layer;
a plurality of conductive structural elements arranged on the film and composed of a material that is configured for inductive stimulation; and
a sensor mounted on the at least one region of the component, the sensor including a transmitter/receiver, electrical and data connectors, and a coil for inductive heating of the conductive structural elements.

17. The motor vehicle component assembly of claim 16, wherein the supporting layer is composed of an opaque material.

18. The motor vehicle component assembly of claim 16, wherein the covering layer is composed of a transparent material.

19. The motor vehicle component assembly of claim 16, wherein the component comprises a motor vehicle number/license plate holder.

20. The motor vehicle component assembly of claim 16, wherein the coil is integrated within the sensor.

* * * * *